United States Patent [19]

Galarowic

[11] Patent Number: 4,858,301
[45] Date of Patent: Aug. 22, 1989

[54] WORK STATION

[75] Inventor: Lawrence A. Galarowic, Dearborn, Mich.

[73] Assignee: Visi-Trol Engineering Co., Detroit, Mich.

[21] Appl. No.: 240,919

[22] Filed: Sep. 6, 1988

[51] Int. Cl.4 .................... B23Q 7/00; B23Q 1/12; B23C 1/12
[52] U.S. Cl. .................................. 29/563; 29/564; 409/201
[58] Field of Search ............ 408/43, 44, 50, 53, 408/708, 709; 409/199, 201, 211, 216; 29/26 R, 26 A, 563, 564

[56] References Cited

U.S. PATENT DOCUMENTS

| 2,956,482 | 10/1960 | Olton | 409/211 |
|---|---|---|---|
| 3,552,240 | 1/1971 | Wusteney et al. | 77/64 |
| 4,093,199 | 6/1978 | Hefner | 269/61 |
| 4,132,494 | 1/1979 | Aldridge, Jr. | 408/54 |
| 4,168,826 | 9/1979 | Rottler | 269/73 |
| 4,213,721 | 7/1980 | Aldridge, Jr. | 408/54 |
| 4,541,620 | 9/1985 | Rottler et al. | 269/46 |
| 4,589,174 | 5/1986 | Allen | 409/201 X |
| 4,637,761 | 1/1987 | Murray et al. | 409/216 |
| 4,644,635 | 2/1987 | Murai et al. | 29/568 |
| 4,658,485 | 4/1987 | Yang | 29/26 A |
| 4,730,961 | 3/1988 | Cassan | 409/211 X |

FOREIGN PATENT DOCUMENTS

| 2150947 | 4/1973 | Fed. Rep. of Germany | 409/211 |
|---|---|---|---|
| 2255540 | 5/1973 | Fed. Rep. of Germany | 409/211 |

Primary Examiner—Steven C. Bishop
Attorney, Agent, or Firm—Gifford, Groh, Sheridan, Sprinkle and Dolgorukov

[57] ABSTRACT

A work station having an arch frame which adjustably carries work processing units for performing an operation on work located on a carrier in an archway below the arch frame. The position of the work processing units are adjusted to accomodate different work configurations. The arch frame work station design has particular utility in assembling and machining V engine blocks where models have different V angles.

5 Claims, 3 Drawing Sheets

WORK STATION

BACKGROUND OF THE INVENTION

1. Field of the Invention

This invention relates to a work station, and, more particularly, to a work station in which work processing units or machining units which hold tools performing the work are moveable on a frame structure to accommodate different work products on a carrier below the frame member. This invention has particular application to the machining or assembly of V engine blocks where different engine models have different V-angles between the two cylinder banks.

2. Description of the Prior Art

V engine blocks have cylinder bores, tapped holes and the like on each side of the block which extend into the block at a common angle inclined from the vertical axis. In order to drill, tap, bore and otherwise machine or access for assembly the two banks of the block, the block is commonly mounted on a rotatable fixture so that the upper face of one side of the block can be brought into a horizontal plane for a machining tool moveable on vertical axes in a boring, drilling, etc. machine or a dedicated work transfer device designed to machine a particular model of engine. When one side of the block has been finished, the block can be rotated to align the other face of the block in a horizontal plane for performing a similar machining function. This procedure requiring rotation or indexing of the fixture holding the engine block is time consuming.

If a particular transfer machine is designed to machine or access for assembly one or both faces of the V block at the same time, the two tool carriages are mounted rigidly to a frame permitting only in and out feed of the tool spindle or quill to perform the required operation. A new transfer machine must be constructed for each different V-angle.

It is a primary purpose of the subject invention to provide a work station in which a work processing unit or machining unit containing the working tool is adjustable mounted on a frame structure so that the unit can be moved on the frame to accommodate engines having different V-angles. Preferably, the frame structure supports two work processing units so that simultaneous access of both faces of the V engine block can be accomplished and adjustment of both units can be made to accommodate a different V-angle.

SUMMARY OF THE INVENTION

A work station capable of accommodating different engine models with different V-angles is realized by the invention in providing an arch frame structure in which the work processing units are adjustably mounted on the arch frame. A work carrier holding the work is located in the archway under the arch frame structure. A tool is located on the work processing unit and means are provided for infeeding and withdrawing the tool forward and away from the work carrier.

The arch frame structure includes two spaced arcuate arch frame members parallel to each other. The work processing machining unit is adjustably mounted to each of the frame members. Typically two work processing or machining units are supported by the arch frame members in position to access the two faces of the V engine block.

The work processing units are provided with rollers for movement along guideways on the arcuate arch frame members to accurately and quickly relocate the work processing units on the frame. To provide power movement of the work processing units on the arcuate arch frame members, a power drive including a pinion is provided for each work processing unit, and the pinion travels in an arcuate gear rack mounted on the arch frame structure to position the work processing unit. Preferably an arcuate gear rack would be attached to each arcuate arch frame member so that each work processing unit would be driven by pinions engaging both arcuate gear racks.

DRAWING

The preferred embodiments of the invention are illustrated in the drawing in which.

DETAILED DESCRIPTION OF THE PRESENTLY PREFERRED EMBODIMENT

Figure 1:
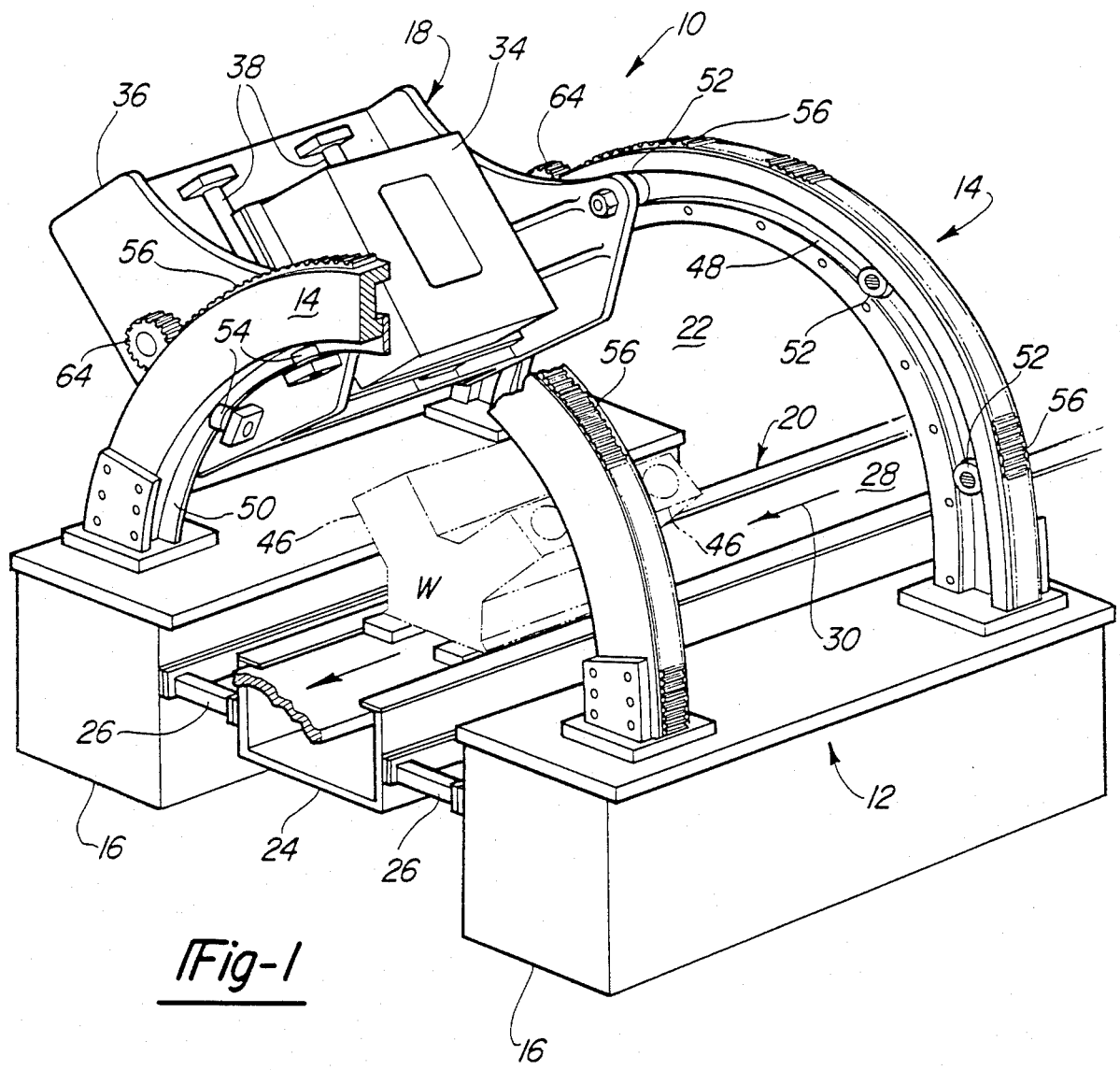
FIG. 1 is a perspective view of the work station of this invention with portions broken away to show the various features of the station.
Figure 2:
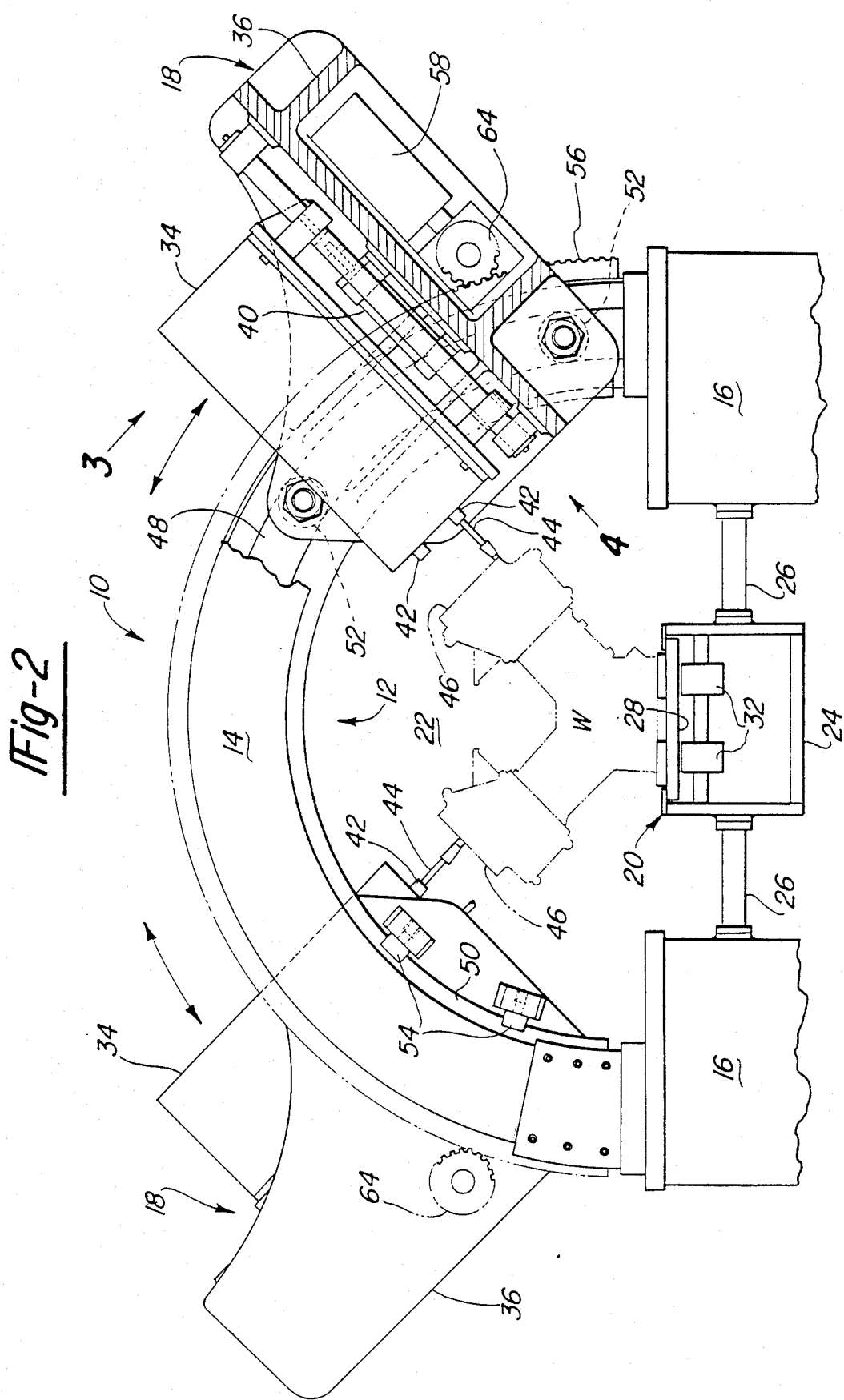
FIG. 2 is an elevational view of the work station of this invention showing the movement of the work processing units relative to an arcuate arch frame member by the mechanism of this invention and showing the relationship of the tools to the work which is illustrated as a V engine block drawn in phantom.
Figure 3:
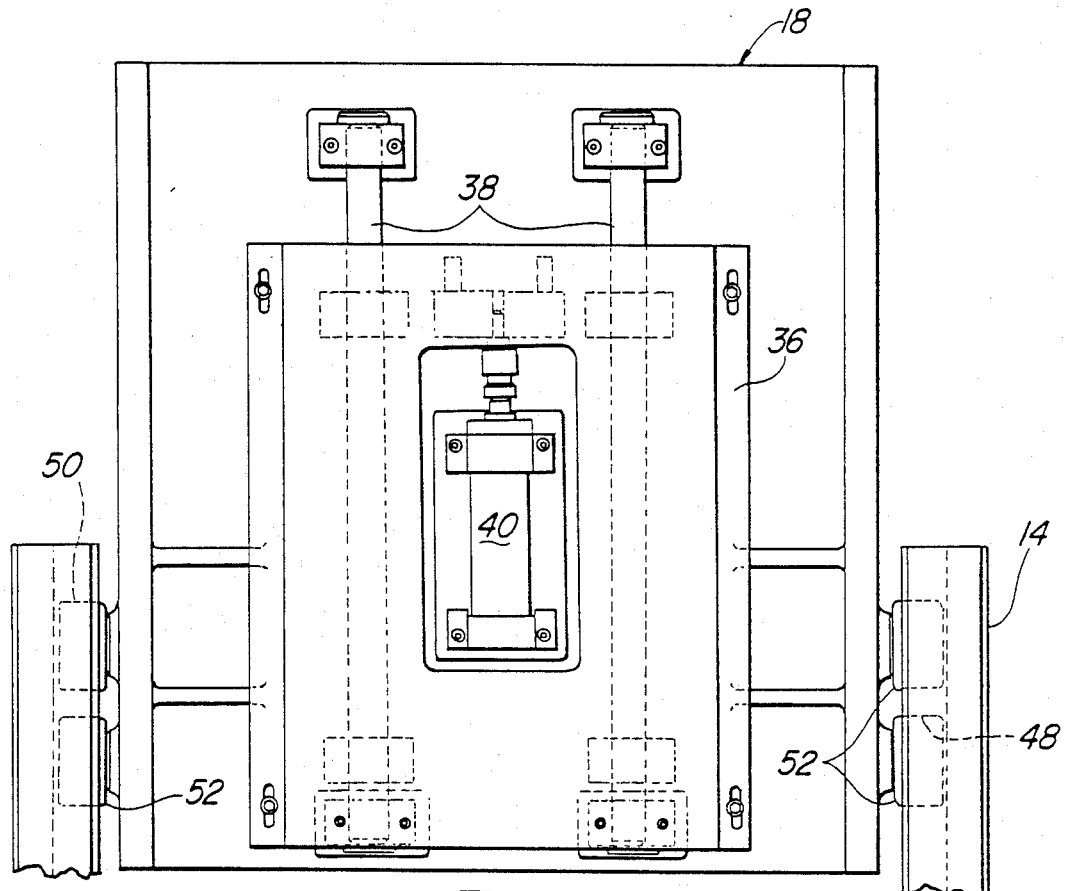
FIG. 3 is a plane view of one of the work processing or machining units taken in the direction of arrow 3 in FIG. 2.
Figure 4:
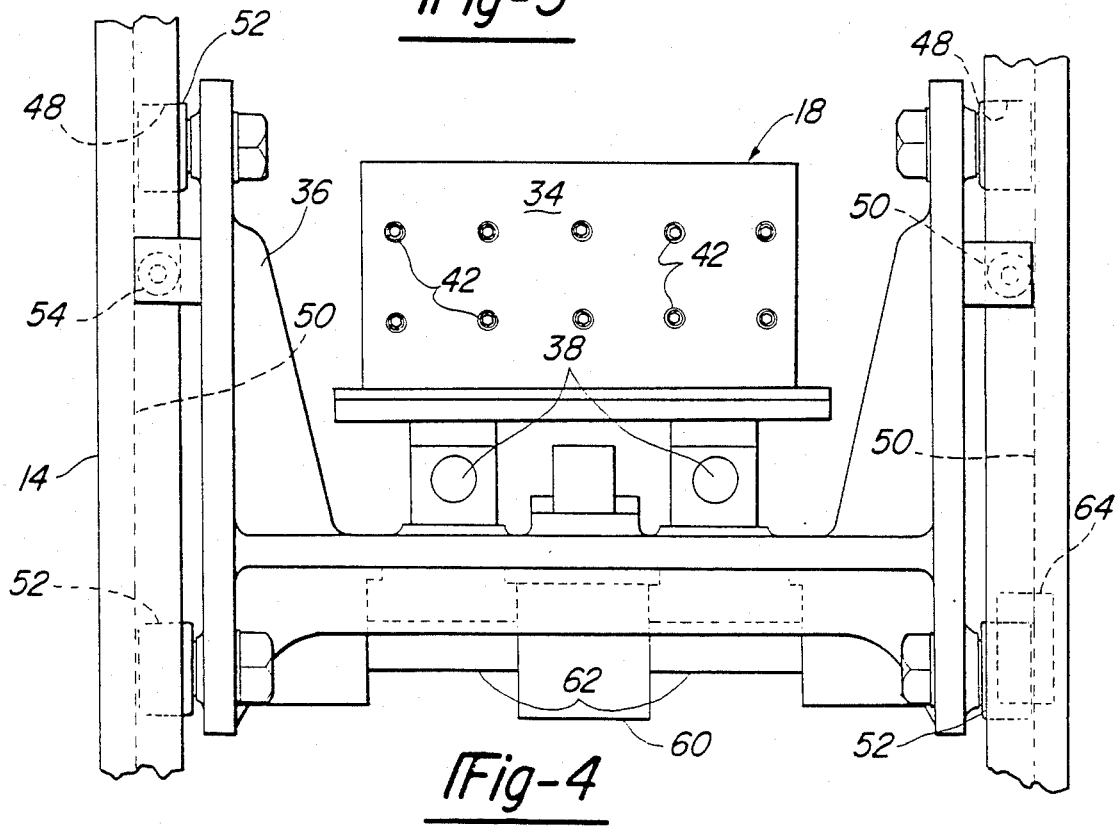
FIG. 4 is an end view of one of the work processing units taken in the direction of the arrow 4 in FIG. 2.

Referring to the drawing, and particularly to FIGS. 1 and 2, the work station 10 is shown as including an arch frame structure 12 which includes a pair of spaced arch frame members 14 mounted parallel to each other extending upwardly from pillars 16. Work processing units or machining units 18 are adjustably mounted to the two arch frame members 14, only one of which is shown in FIG. 1 to show other details.

A work carrier 20 is supported in archway 22 below the arch frame members 14 where a carrier can be mounted to flooring or a machine bed or as shown between pillars 16 of frame structure 12. The carrier is preferably a moving conveyor type which may transport the work between successive work stations 10. As shown in FIGS. 1 and 2, the work carrier 20 has its own frame structure 24 mounted by cross members 26 to the pillars 16. A moving conveyor belt 28 is suitably driven in the direction of arrow 30 by means not shown and is supported at spaced points as by rollers 32 shown in FIG. 2. Work W is shown as a V engine block which is conveyed to a position in archway 22 and brought to a stop before the machining operation is commenced.

Power heads 34 are mounted on the frame structure 36 of the individual work processing or machining units 18 for reciprocation on ways or slides 38 by hydraulic or electric drive 40. Power heads 34 may contain a number of rotating spindles 42 each of which can carry a tool 44 such as a drill, tap, end mill, fastening tool or the like. Reciprocation of power heads 34 on the machining units 18 by hydraulic or electric drive 40 advances the tools 44 toward and away from faces 46 of engine block W. Spindles 42 may also be individually moveable toward and away from the work.

Arch frame members 14 are provided with arcuate cam slots 48 in their opposing faces and arcuate slots 50 facing inwardly towards archway 22. Rollers 52 and 54 suitably affixed to work processing unit frames 36 ride in cam slots 48 and 50 respectively to guide and support the work processing units 18 on the arch frame members 14.

Each of the arch frame members 14 are provided with arcuate gear rack sections 56 as best seen in FIG. 2, each of the work processing units 18 carries a hydraulic or electric drive 58 connected to gear reducer 60 and suitable shaft 62 to drive pinion gears 64 which engage the arcuate gear racks on both arch frame members 14 to precisely position the work processing units on the arch frame members 14.

Thus this invention presents a quick and accurate system for changing the position of the machining units operating on the two banks of a V engine block so that engine blocks with different V-angles can be machined or accessed for assembly.

In a broader sense, the invention provides a system for changing the position of work processing units so that, for example, product models with different specifications can be successfully worked upon. The work processing units can provide a variety of functions other than machining such as riveting, gluing, welding, painting, piercing and the like. Automation can be as sophisticated as is warranted. For example, a computer control system could be arranged to detect the next product or engine block on the work carrier and position the work processing units accordingly along with the particular tools and cycles to be used.

The embodiments of the invention in which an exclusive property or privilege is claimed are defined as follows:

1. A work station comprising, in combination: a pair of spaced apart and parallel arcuate arch frame members, said frame members having a predetermined radius and a predetermined axis;
    a work processing slide circumferentially movably mounted to and extending between said arch frame members;
    means for circumferentially moving said slide along said frame members;
    a work carrier located axially under said arch frame members for successively moving work pieces under said work processing slide and axially with respect to said arch frame members;
    a tool located on said work processing slide;
    means for moving said tool radially towards and away from said work carrier.

2. The work station according to claim 1 wherein said work processing slide is provided with rollers for movement along guideways on said arcuate arch frame members.

3. The work station according to claim 1 wherein said work processing slide contains a power drive for moving the work processing slide along said arcuate arch frame members.

4. The work station according to claim 3 wherein said power drive includes a pinion for movement along an arcuate gear rack supported by at least one of said arcuate arch frame member.

5. The work station according to claim 4 wherein each arcuate arch frame member carries an arcuate gear rack each rack being engaged by a pinion driven by said power drive.

* * * * *